(12) United States Patent
Mizuno et al.

(10) Patent No.: US 7,120,768 B2
(45) Date of Patent: Oct. 10, 2006

(54) SNAPSHOT ACQUISITION METHOD, STORAGE SYSTEM AND DISK APPARATUS

(75) Inventors: Yoichi Mizuno, Yokohama (JP); Naoto Matsunami, Hayama (JP); Koji Sonoda, Sagamihara (JP); Shinichi Kishima, Yokohama (JP); Manabu Kitamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 271 days.

(21) Appl. No.: 10/279,581

(22) Filed: Oct. 24, 2002

(65) Prior Publication Data

US 2003/0229651 A1  Dec. 11, 2003

(30) Foreign Application Priority Data

Mar. 22, 2002  (JP) .............................. 2002-081190

(51) Int. Cl.
*G06F 12/00* (2006.01)
(52) U.S. Cl. ...................... 711/162; 711/161; 707/203; 707/204
(58) Field of Classification Search ................ 711/162, 711/161; 707/203–204
See application file for complete search history.

(56) References Cited

U.S. PATENT DOCUMENTS

| | | | | | |
|---|---|---|---|---|---|
| 5,649,152 | A | * | 7/1997 | Ohran et al. ................. | 711/114 |
| 5,835,953 | A | * | 11/1998 | Ohran ......................... | 711/162 |
| 5,978,805 | A | * | 11/1999 | Carson ........................ | 707/10 |
| 6,073,222 | A | * | 6/2000 | Ohran ......................... | 711/162 |
| 6,085,298 | A | * | 7/2000 | Ohran ......................... | 711/162 |
| 6,473,775 | B1 | * | 10/2002 | Kusters et al. .............. | 707/200 |
| 6,674,447 | B1 | * | 1/2004 | Chiang et al. .............. | 345/704 |
| 2003/0221075 | A1 | * | 11/2003 | Achiwa et al. ............. | 711/162 |
| 2005/0033878 | A1 | * | 2/2005 | Pangal et al. ................. | 710/36 |

OTHER PUBLICATIONS

Using two-level stable storage for efficient checkpointing□□Silva, L.M.; Silva, J.G.; Software, IEE Proceedings- [see also Software Engineering, IEE Proceedings], vol. 145 , Issue: 6 , Dec. 1998; pp. 198-202.*

Effective and concurrent checkpointing and recovery in distributed systems□□Hou, C.J.; Tsoi, K.S.; Han, C.C.; Computers and Digital Techniques, IEE Proceedings- , vol. 144 , Issue: 5 , Sep. 1997 □□pp. 304-316.*

Adaptive independent checkpointing for reducing rollback propagation□□Xu, J.; Netzer, R.H.D.; Parallel and Distributed Processing, 1993. Proceedings of the Fifth IEEE Symposium on , Dec. 1-4, 1993 □□pp. 754-761.*

* cited by examiner

*Primary Examiner*—Nasser Moazzami
(74) *Attorney, Agent, or Firm*—Hogan & Hartson LLP

(57) ABSTRACT

A network attached storage (NAS) system includes a disk array unit equipped with a copy device that copies data, and a NAS processing unit that provides file service via a network and is connected via a communication path to the disk array unit. The NAS processing unit is equipped with a snapshot management device that manages snapshots. The snapshot management device of the NAS processing unit designates a physical block to be copied as a snapshot. The copy device on the disk array unit copies the designated physical block within the disk array unit to create a snapshot and stores the snapshot in a separated region. The snapshot management device of the NAS processing unit manages meta data of the snapshot data in a manner accessible by the user depending on requirements.

21 Claims, 6 Drawing Sheets

Before Acquisition of Snapshot

After acquisition of Snapshot

Fig. 4

| File Name | Original Block | | | Snapshot Block | | 
|---|---|---|---|---|---|
| | LUN | LBA | Block No. | LUN | LBA |
| FILE2 | 0 | 100 | 4 | 1 | 0 |
| | – | – | – | – | – |
| | ⋮ | ⋮ | ⋮ | ⋮ | ⋮ |
| ⋮ | ⋮ | ⋮ | ⋮ | ⋮ | ⋮ |

| Fine Name | Original Block | | | Snapshot Block | |
|---|---|---|---|---|---|
| | LUN | LBA | | LUN | LBA |
| FILE2 | 0 | 100 | 4 | 1 | 0 |
| | 0 | 132 | 8 | 1 | 4 |
| | ⋮ | ⋮ | ⋮ | ⋮ | ⋮ |
| | ⋮ | ⋮ | ⋮ | ⋮ | ⋮ |

| Group Number | Original Block | | | Snapshot Block | | Differential | Status |
|---|---|---|---|---|---|---|---|
| | LUN | LBA | Number of Blocks | LUN | LBA | | |
| 1 | 0 | 100 | 4 | 1 | 0 | 0 | Synchronizing |
| | 0 | 112 | 8 | 1 | 4 | 1 | |
| | 0 | 132 | 8 | 1 | 12 | 1 | |
| ⋮ | ⋮ | ⋮ | ⋮ | ⋮ | ⋮ | ⋮ | ⋮ |

SNAPSHOT ACQUISITION METHOD, STORAGE SYSTEM AND DISK APPARATUS

FIELD OF THE INVENTION

The present invention relates to snapshot acquisition methods, storage systems and disk apparatuses, and more particularly to snapshot acquisition methods, storage systems and disk apparatuses in a network attached storage system.

DESCRIPTION OF RELATED ART

Among conventional technologies relating to storage systems, a network attached storage (NAS) system has been proposed. In the network attached storage system, a dedicated server (NAS processing unit) that provides file service via a network is provided on a disk array such that storage apparatuses can be directly accessed from the network.

In general, a back up system is necessary for data recorded in a storage apparatus to periodically copy and preserve the data in magnetic tape, etc. so that lost data can be recovered in the event there is a breakdown of an apparatus, and defect in a software, or when data is lost through erroneous operation. In the NAS system, it is also essential to have a similar backup system.

Backup operation is conducted in a way that data will not be renewed during the backup operation because the copied data will be incompatible if they are renewed during the backup operation. It is necessary to ensure the memory image of the data at the starting point of the backup. Avoiding the renewal of data to be backed up is possible by stopping the program, except for the back up program that accesses the data. However, for systems requiring high adaptability, suspending the program for long hours is not possible. Because of this, a set up is required to preserve the data's memory image at the starting point of the backup operation without obstructing the program from renewing the data. In general, the memory image of data at a certain point of time is called a snapshot, and the data targeted for snapshot acquisition is called the original data. In the NAS system, the known methods for providing a situation where data can be renewed while preserving the snapshot at a designated point of time are by preserving pre-renewal data by the NAS processor or data duplicating by the disk array.

A method of acquiring snapshots using the aforementioned conventional technology is described below.

Preservation of pre-renewal data by the NAS processing section is performed by preserving the memory contents prior to the renewal in a separate memory region when renewing the original data after the acquisition of the snapshot. Logically, while the snapshot is accessed as a separate data independent from the original data, the snapshot shares the memory region with the original data for the portion of the original that has not been renewed after the acquisition of the snapshot. As for the renewed portion of the original data, the pre-renewal memory contents preserved in a separate region are referred. In the NAS case, there is a snapshot technology that exists in units of files. And, when the NAS processor is instructed from the outside to acquire a snapshot, it preserves the pre-renewal file image in a separate region to obtain a snapshot. Even when a file renewal occurs after the instruction is issued, the preserved image is not damaged.

On the other hand, in data duplication by a disk array, all data are duplicated (mirrored) in two memory regions in the disk array in the normal state when a snapshot is not acquired. And, in this conventional technology, the management program in the disk array stops the duplicating process and separates the two memory regions into independent regions when acquiring the snapshot. One region is provided for the original data and the other region for the snapshot.

In the aforementioned conventional technology employed in the method for acquiring snapshots in the NAS system, the NAS processor is used to copy data to preserve the pre-renewal data. As a result, the CPU load of the NAS processor that reads and writes data and the volume of data communication on the communication path connecting the NAS processor and the disk array increases, which results in problems such as drastically lowered execution speed of the application program compared with systems that do not acquire snapshots. The deterioration in performance is particularly conspicuous in processes involving renewing a large volume of data such as replicating a data base.

Also, the conventional technology of duplicating data with the disk array has a problem in that snapshots cannot be obtained in units of files because the file structure is unknown to the disk array. Also, the conventional technology of duplicating data by the disk array has a problem in that the storage capacity needs to be doubled because a disk apparatus having the same size as that of the apparatus storing the original data is required as the unit that is duplicated is the entire disk.

SUMMARY OF THE INVENTION

The present invention solves the problem of the conventional technology described above, and the present invention pertains to a method to acquire snapshots in a NAS system in units of files with a low load, and a storage system and disk apparatus using the method.

An embodiment of the present invention provides a snapshot acquisition method in a storage system composed of a NAS processor unit that provides file service via a network and a disk apparatus for storing data, wherein the NAS processor unit manages snapshots. Upon receiving a request to renew a data block that is targeted for a snapshot, the NAS processor unit instructs the disk apparatus to copy the data block that is targeted for the snapshot, and the disk apparatus preserves the data instructed to be copied in a separate region based on the instruction to copy the data sent from the NAS processor.

Also, another embodiment of the present invention provides a storage system that is composed of a NAS processor unit that provides file service via a network and a disk apparatus for storing data, wherein the NAS processor unit is equipped with a snapshot management device that manages snapshots, and the disk apparatus is equipped with a copy device that copies data. Upon receiving a request to renew a data block that is targeted for a snapshot, snapshot management device instructs the copy device to copy the data block that is targeted for the snapshot, and the copy device copies the data based on the instruction and preserves the data instructed to be copied in a separate region.

In accordance with the present invention equipped with the aforementioned system or method, the snapshot management device manages meta data for the snapshot files created, and the user can access the files whenever necessary. Also, in the present invention, the snapshot management device provided on the NAS processor unit works in association with the copy device of the disk array, and uses the copying function of the copy device to acquire snapshots in units of files at a low load.

BRIEF DESCRIPTION OF THE DRAWINGS

FIG. 4 shows an example of the structure of an address control table.

FIG. 5 shows an address control table after a data renewal takes place.

FIG. 7 shows an example of the structure of a duplicating-status control table 131.

PREFERRED EMBODIMENTS OF THE PRESENT INVENTION

A snapshot acquisition method and a storage system using the method in accordance with embodiments of the present invention are described in detail with reference to the accompanying drawings.

Figure 1:
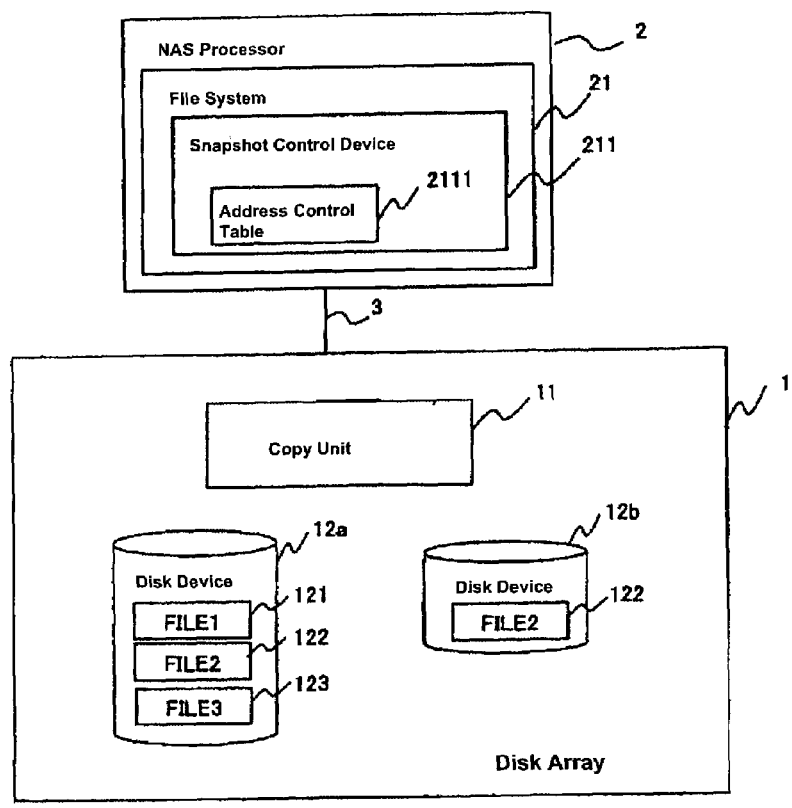
FIG. 1 shows a block diagram of the structure of a storage system in accordance with a first embodiment of the present invention.

FIG. 1 is a block diagram of the configuration of a storage system in accordance with a first embodiment of the present invention. FIG. 1 shows a disk array apparatus (hereafter simply called a "disk array") 1, a NAS processor 2, a network 3, a copy unit 11, the disks devices 12a and 12b, files 121–123, a file system 21, a snapshot management device 211, and an address control table 2111.

As shown in FIG. 1, the storage system in accordance with the first embodiment of the present invention is formed from the disk array 1, the NAS processor 2 that performs processes for providing file service via a network. The network 3 is a communication path connecting the disk array 1 with the NAS processor. The disk array 1 is formed from the copy unit 11 that copies data in physical blocks, and the disk devices 12a and 12b. The files 121–123 are stored in the disk devices 12a and 12b. A file consists of one or more physical blocks.

The NAS processor 2 is equipped with the file system 21 for controlling files. The file system 21 includes the address control table 2111 for managing physical addresses of the files targeted for snapshots, and the snapshot management device 211 that manages the snapshots.

In the first embodiment of the present invention with the aforementioned structure, when there is an external instruction to the NAS processor 2 to acquire a snapshot, the snapshot management device 211 rewrites the directory structure in the file system 21, and adds one or more target files depending on the external instruction to a snapshot directory.

Figure 2:
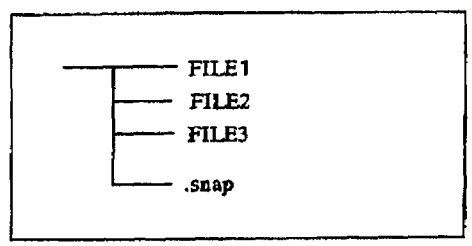
FIGS. 2(a) and 2(b) show an example of rewriting a directory structure.
Figure 2:
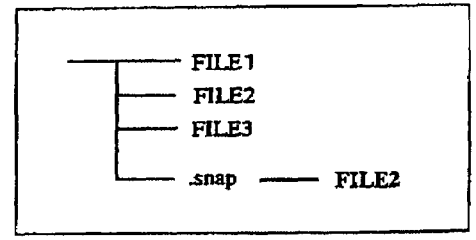

FIGS. 2(a) and 2(b) show an example of rewriting of the directory structure. FIGS. 2(a) and 2(b) show directory structures before and after the snapshot acquisition takes place, respectively. In this example, ".snap" is a directory for a snapshot, and "FILE2" is a file targeted for a snapshot. As shown in these drawings, it is understood that the "FILE2" is added under the directory ".snap" in the directory structure after the snapshot is acquired. The "FILE2" that has been existing before acquisition of the snapshot, and the "FILE2" which is added anew after the acquisition of the snapshot are recognized by the user as separate files, which are logically accessible independently. Physically, there is one set of data in the disk array 1 at some point in time immediately after the snapshot is acquired.

When renewing the original data after acquiring the snapshot, in the conventional method, the NAS processor reads pre-renewal memory contents from the disk array and writes the contents into a separate memory region. However, in accordance with the embodiment of the present invention, the copy unit 11 that is provided in the disk array 1 directly copies pre-renewal memory contents within the disk array 1.

Figure 3:
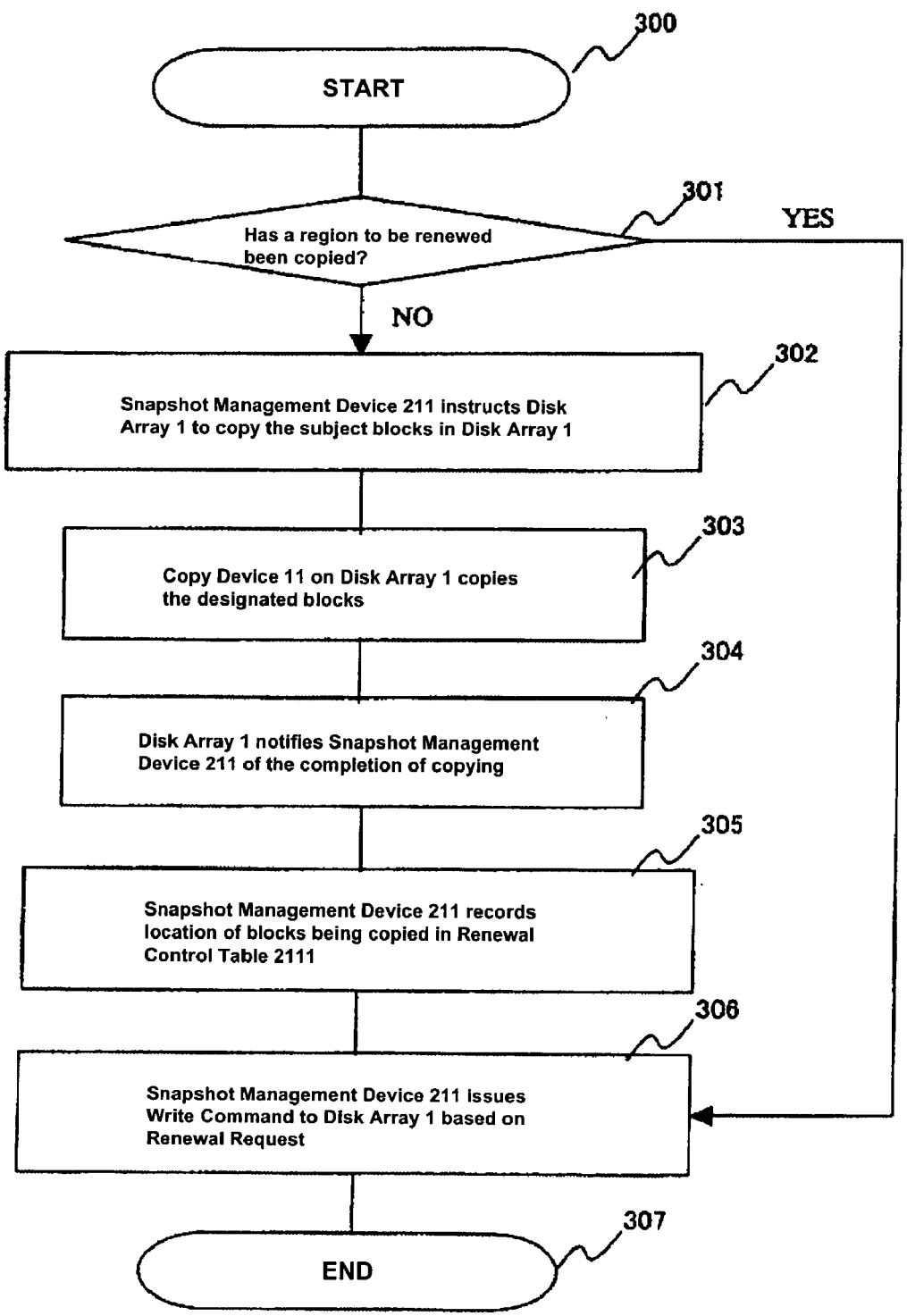
FIG. 3 shows a flowchart of process operations at the time of data renewal after a snapshot is acquired.

FIG. 3 is a flow chart that explains processing operations performed at data renewal after the acquisition of the snapshot. The processing operations will be described next.

(1) When there is a request to renew the original file after the snapshot is acquired, the snapshot management device 211 refers to the address control table 2111 to determine whether or not a target block to be renewed has already been copied (Step 301).

(2) When it is determined in Step 301 that the target block had been copied, the snapshot management device 211 issues a write command to the disk array 1 on the basis of the renewal request and then ends the process (Step 306).

(3) If the determination in Step 301 indicates that the target block has not been copied, the snapshot management device 211 instructs the disk array 1 to copy the target block. At this time, the snapshot management device 211 designates the address and the block length of the source block to be copied and the destination address of the block copied. (Step 302).

(4) Upon receiving the instruction to copy, the copy unit 11 on the disk array 1 copies the designated block. When the copying is completed, the disk array 1 issues a completion report to the snapshot management device 211 (Step 303, 304).

(5) Upon receiving the completion report, the snapshot management device 211 records the address, the block length of the source block to be copied and the destination address on the address control table 2111. In this manner, the snapshot management device 211 manages the meta data of the snapshot file, such that where the pre-renewal data is physically preserved on the disk array is known. (Step 305).

(6) When the recording to the address control table 211s ends, the snapshot management device 211 issues, based on the renewal request, a write command to the disk array 1 and end the process (Step 306).

The data of the original file can be renewed through the process explained above. However, as the source data has already been copied to a separate region, the data can be accessed as the snapshot file that was taken at the time when the snapshot is acquired.

When reading the snapshot file, the snapshot management device 211 refers to the address control table 2111 and reads out the original data for portions where no renewal has been made, and reads out data at the copy destination address saved in a separate region for portions in the original data that have been renewed after the snapshot was acquired.

FIG. 4 is shows an example of the structure of the address control table. FIG. 5 shows an example of the address control table after a data renewal takes place. Next, the rewriting of the address control table 2111 will be described with reference to specific examples of data renewal that may take place after the acquisition of the snapshot.

As shown in FIG. 4, the address control table 2111 includes "File Name" section that stores file names targeted for snapshots. In the example described here, a target file is "FILE2. "Original Block" section of the address control table 2111 shows physical block information containing the original data, and "Snapshot Block" section shows physical block information of snapshot data. "LUN" (Logical Unit Numbers) and "LBA" (Logical Block Addresses) are to express the respective physical addresses in the disk array 1, and "Number of Blocks" section represents the length of blocks. In the case of the example, the address control table 2111 indicates that there are original blocks at the address of LBA100 in LUN0 with a length of blocks being 4, and that its snapshot blocks exist at the address LBA0 in LUN1. As for other blocks, it is understood from the table that there are no snapshot blocks and that they are uncopied regions.

Here, let us consider a situation in which a renewal request for renewing data in "FILE2" is generated, and its physical address is LBA1 32 within LUN0, and its number of blocks is 8. At this time, the snapshot management device 211 refers to columns at "FILE2" of the address control table 2111 shown in FIG. 4 to confirm if the target blocks are uncopied regions. Next, the snapshot management device 211 decides, for example, an address LBA4 in LUN1 among the empty disk regions as a snapshot block, and issues a copy instruction to the disk array 1. When the copying is completed, the snapshot management device 211 enters the addresses of the original blocks and the snapshot blocks into the address control table 2111. In the case of the aforementioned example, the entries in the address control table 2111 after the renewal will be those shown in FIG. 5, which indicates that the original blocks exist at the address LBA132 in LUN0, and its number of blocks is 8, while the snapshot blocks exist at the address LBA4 in LUN1.

When reading a snapshot file, snapshot data stored in a region for 4 blocks that starts from LBA0 in LUN0, and in a region for 8 blocks that starts from LBA4 in LUN1 are read out for the portion for 4 blocks that starts from LBA100 in LUN0 and for the portion for 8 blocks that starts from LBA 132 in LUN0, respectively, where the original data have been renewed. Also, the original data may be read as is for portions that have not been renewed.

In accordance with the first embodiment of the present invention described above, the snapshot management device 211 provided on the NAS processor 2 issues a copy instruction to the copy unit 11 of the disk array 1, and the copying is performed within the disk array 1. As a result, the load on the communication path between the NAS processor and the disk array can be reduced, and also the load on the NAS processor can be reduced. Thus, snapshots in units of files can be acquired with a low load.

Also, in accordance with the first embodiment of the present invention described above, only the renewed portions are preserved in separate regions, and thus the size of the disk region needed for snapshots can be made extremely small compared to the conventional technology that duplicates the entire disk device within the disk array.

Figure 6:
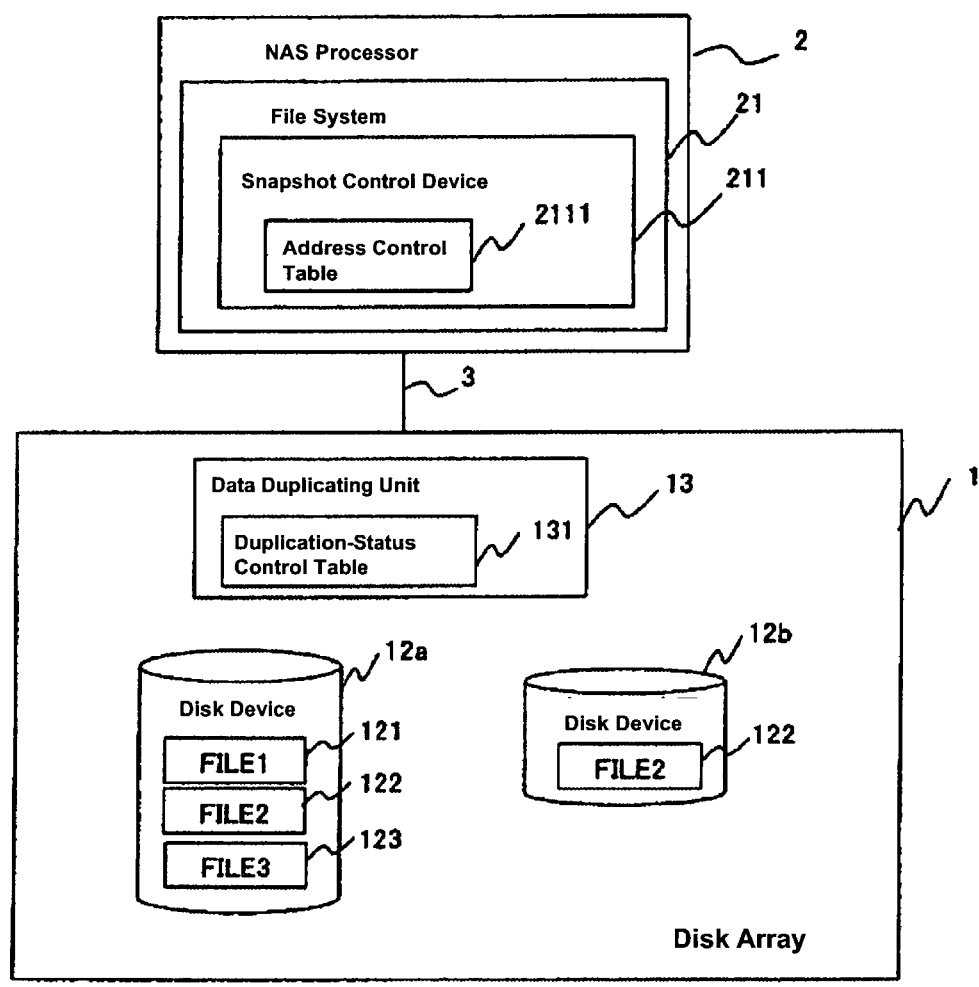
FIG. 6 shows a block diagram of the structure of a storage system in accordance with a second embodiment of the present invention.

FIG. 6 is a block diagram of a structure of the storage system in accordance with a second embodiment of the present invention. FIG. 6 shows a data duplicating unit 13, and a duplicating-status control table 131. Other reference numbers indicate the same components shown FIG. 1.

The second embodiment of the present invention shown in FIG. 6 is different from the first embodiment in that the disk array 1 is equipped with the data duplicating unit 13 instead of the copy unit. The data duplicating unit 13 is provided for duplicating data in units of blocks, and is equipped with the duplicating-status control table 131 that manages addresses of blocks to be duplicated and their status.

In the second embodiment of the present invention, files targeted for a snapshot are duplicated. At the time when the snapshot is acquired, one of the duplicated files is set as the original files and the other as the snapshot files, such that the snapshot can be obtained. Files that can be targeted for a snapshot are designated in advance by the user. The snapshot management device 211 writes in the address control table 2111 addresses of all the original blocks storing data of the designated original files and destination addresses of the snapshot blocks where the files are copied. The disk array 1 is also notified of the same contents of these addresses.

When the data duplicating unit 13 on the disk array 1 receives the notice of the blocks targeted for duplication and the destination addresses where the blocks are copied, the data duplicating unit 13 enters the addresses in the duplicating-status management table 131 and then copies the data of the designated original blocks in the snapshot blocks to thereby duplicate the data.

FIG. 7 shows an example of the structure of the duplicating-status control table 131. The duplicating-status control table 131 shown in FIG. 7 includes "Group Number" section storing group numbers each for identifying a group of blocks to be managed together. Even if blocks are in the same file, the blocks may not necessarily be stored contiguously on the disk. Because of this, it becomes necessary to control these distributed blocks in each group. One group corresponds to a single file. The original blocks and snapshot blocks have the same contents as those of the address control table 2111. These addresses are stored on the basis of the notice from the snapshot management device 211. "Differential" section represents whether or not the original data and the snapshot coincide with each other. If they coincide, "0" is stored at the differential section, and if not, "1" is stored. "Status" section shows the status of the groups of blocks. There are three categories of status, i.e., "Synchronized", "Synchronizing" and "Isolated". The data duplicating unit 13 rewrites these statuses as the status changes.

For example, in this embodiment, "Synchronized" means a state where the contents of a group of original blocks within a certain file and a group of snapshot blocks completely coincide with one another, and "Synchronizing" means a state where the contents do not completely coincide with one another.

When the status is in "Synchronizing" or "Synchronized", access requests from the outside are accepted only for the original blocks, while requests for renewal of the snapshot blocks are rejected. For example, when there is a renewal request issued to the disk array 1, the data duplicating unit 13 judges whether or not blocks requested to be renewed are those targeted for duplicate. If so, renewal data is written into both the original blocks and the snapshot blocks to maintain equal contents for the respective blocks. On the other hand, if the blocks are not those targeted for duplicate, renewal data is written as is only in the applicable blocks. In the case of the "Isolated" state, independent accesses are generated for the respective original blocks and snapshot blocks, and renewal data is written independently into the respective original blocks and snapshot blocks.

Figure 8:
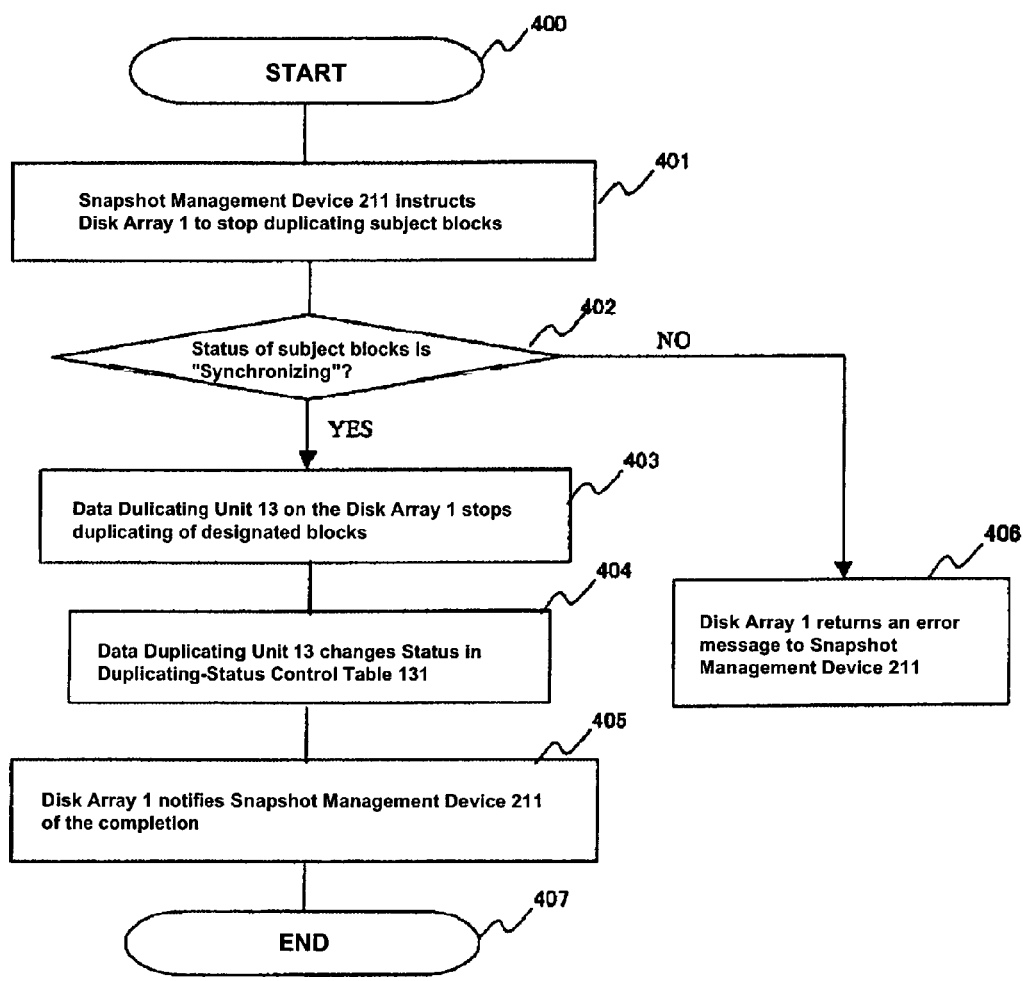
FIG. 8 shows a flowchart of process operations at the time of snapshot acquisition.

FIG. 8 is a flow chart for explaining the operation when the snapshot is acquired.

(1) When there is an instruction from outside to acquire a snapshot, the snapshot management device 211 designates a subject group number and sends the same to the disk array 1, and issues an instruction to stop the duplicating (Step 401).

(2) When the data duplicating unit 13 on the disk array 1 receives the instruction to stop the duplicating, it refers to the duplicating-status control table 131 and verifies whether or not the status of the target blocks in the designated group number is "Synchronized" (Step 402).

(3) If the status is not "Synchronized" or the target blocks are not registered in the duplicating-status control table 131, during the verification in Step 402, the disk array 1 returns an error message to the snapshot management device 211 (Step 406).

(4) If the status is "Synchronized" as a result of verification in Step 402, the data duplicating unit 13 stops the duplicating of the target blocks, and manages the original blocks and snapshot blocks as independent blocks (Step 403).

(5) Next, the data duplicating unit 13 changes the status of the target blocks in the duplicating-status control table 131 from "Synchronized" to "Isolated". The state in which the original blocks and the snapshot blocks are isolated from one another, and handled as independent blocks is called "Isolated". When a renewal request in the original blocks is made at this time, the renewal data is written only into the original blocks. Occurrence of the renewal is recorded in the duplicating-status control table 131, and when even a part of the original block is renewed, the corresponding "Differential" status is set at "1" (Step 404).

(6) When the status change is completed, the disk array 1 ends the process (Step 405) after issuing a completion report to the snapshot management device 211.

As explained above, by isolating the duplicated data sets from one another at some point in time, the snapshot at that point of time can be acquired. And, similar to the explanation made with FIG. 2, under the second embodiment of the present invention, the original file and the snapshot file can be recognized by the user as independent files, and can be accessed independently. Also, as data sets in the original file and the snapshot file can exist physically independent from one another, the snapshot management device 211 is able to avoid concentration of accesses to the same disk as the snapshot management device assigns the respective files to physically separate regions.

A delete operation of deleting a snapshot in accordance with the second embodiment of the present invention will be described.

When deleting a snapshot, the snapshot management device 211 issues to the disk array 1 a re-synchronizing instruction that calls for duplicating data again. When the data duplicating unit 13 on the disk array 1 receives a re-synchronizing instruction, it refers to the "Differential" section of the duplicating-status control table 131 and performs a re-synchronizing process that copies the renewed original blocks to the snapshot blocks. When the copy process is being performed, whole status is categorized as "Synchronizing", any renewal request to the snapshot blocks will be rejected. When the copying is completed, the data duplicating unit 13 will rewrite the corresponding status in "Differential" section of the duplicating-status control table 131 to "0". When the "Differential" states of all of the blocks within the group become "0", this means that the contents of the original files and the snapshot files become coincide with one another, such that the status for the group will be set as "Synchronized".

When removing files targeted for snapshot from the registration, the snapshot management device 211 may issue a registration delete instruction to the data duplicating unit 13, and the data duplicating unit 13 may delete the pertinent areas of the duplicating-status control table 131 based on the registration delete instruction.

In accordance with the second embodiment of the present invention, the snapshot management device 211 provided on the NAS processor 2 notifies the data duplicating unit 13 of the disk array 1 of addresses of the original blocks and snapshot blocks, and the data duplication is executed within the disk array 1. As a result, the load on the NAS processor 2 and the load on the communication path that connects the NAS processor 2 with the disk array 1 by can be lowered, and snapshots in units of files can be acquired with a low load.

Also, in accordance with the second embodiment of the present invention, it is possible to disperse the disk access load by allowing data of the original files and data of the snapshot files to exist on physically independent disks, and allowing the snapshot management device to allocate accesses to the respective files in physically separate regions. Moreover, since only the files targeted for snapshots are stored in a separate region, the disk region necessary for the snapshots can be made smaller compared to the disk region required in the conventional method of duplicating the entire disk.

In the first and second embodiments of the present invention described above, the NAS processor and the disk array may be located apart from each other, and may be connected via a network, which comprise a communication path. Also, the system can be configured such that the NAS processor and the disk array are integrated in one piece. In this case, the network could be a mere system path to connect the two.

As explained above, in accordance with the present invention, the load on the NAS processor and the communication path between the NAS processor and the disk array can be reduced, allowing low load snapshot acquisition in units of files. Also, the present invention allows reducing the size of the disk region for snapshots.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A snapshot acquisition method in a storage system including a storage apparatus for storing data and a NAS processing apparatus that provides file service via a communication path and is connected to the storage apparatus, the snapshot acquisition method comprising:

managing snapshots by the NAS processing apparatus;

upon receiving at the NAS processing apparatus a data renewal request to renew data targeted for snapshot, issuing from the NAS processing apparatus a data copy instruction to a copy apparatus of the storage apparatus to copy the data targeted for snapshot; and preserving by the copy apparatus the data in a separate region of the storage apparatus based on the received data copy instruction sent from the NAS processing apparatus;

wherein the preserving step is performed by the copy apparatus of the storage apparatus.

2. A snapshot acquisition method according to claim 1, wherein the communication path is a network.

3. A snapshot acquisition method according to claim 1, wherein the data includes a plurality of files, and each of the files includes at least one block, wherein the data renewal request is an instruction to renew said at least one block in one of the files, wherein the storage apparatus copies said at least one block in the separate region.

4. A snapshot acquisition method according to claim 1, wherein the data copy instruction designates a physical address of the data, a block length of the data, and a physical address at a copy destination where the data is copied.

5. A snapshot acquisition method according to claim 3, wherein the data copy instruction designates a physical address of said at least one block, a block length of said at least one block, and a physical address at a copy destination where said at least one block is copied.

6. A storage system comprising:
a storage apparatus for storing data, the storage apparatus including a copy device that copies data; and
a NAS processing apparatus that provides file service via a communication path and is connected to the storage apparatus, the NAS processing apparatus including a snapshot management device that manages snapshots,
wherein, upon receiving a data renewal request to renew data targeted for snapshot, the snapshot management device issues a data copy instruction to the copy device of the storage apparatus to copy the data targeted for snapshot; and
the copy device receives the data copy instruction from the snapshot management device and copies the data based on the received data copy instruction, and preserves the data in a separate region of the storage apparatus.

7. A storage system according to claim 6, wherein the communication path is a network.

8. A storage system according to claim 6, wherein the data includes a plurality of files, and each of the files includes at least one block, wherein the data renewal request is an instruction to renew the at least one block in one of the files, wherein the storage apparatus copies said at least one block in the separate region.

9. A storage system according to claim 6, wherein the data copy instruction designates a physical address of the data, a block length of the data, and a physical address at a copy destination where the data is copied.

10. A storage system according to claim 8, wherein the data copy instruction designates a physical address of said at least one block, a block length of said at least one block, and a physical address at a copy destination where said at least one block is copied.

11. A snapshot acquisition method in a storage system including a storage apparatus for storing data and a NAS processing apparatus that provides file service via a communication path and is connected to the storage apparatus, the snapshot acquisition method comprising:
managing snapshots by the NAS processing apparatus;
issuing from the NAS processing apparatus a physical address of data targeted for duplication;
duplicating by a copy unit of the storage apparatus the data targeted for duplication based on the physical address of the data targeted for duplicating, in a separate region of the storage apparatus;
wherein the duplicating step is performed by the copy unit of the storage apparatus;
isolating by the copy unit of the storage apparatus the duplicated data based on an instruction from the NAS processing apparatus; and
setting by the copy unit of the storage apparatus one of the duplicated data as a snapshot.

12. A snapshot acquisition method according to claim 11, wherein the data is duplicated in units of data blocks.

13. A snapshot acquisition method according to claim 11, wherein the communication path is a network.

14. A storage system comprising:
a storage apparatus for storing data, the storage apparatus including a data duplicating device that duplicates data; and
a NAS processing apparatus that provides file service via a communication path and is connected to the storage apparatus, the NAS processing apparatus including a snapshot management device that manages snapshots,
wherein the snapshot management device issues to the data duplicating device a duplication instruction including a physical address of data targeted for duplication;
the duplicating device of the storage apparatus receives the duplication instruction from the snapshot management device and duplicates the data targeted for duplication based on the physical address of the data targeted for duplication issued from the snapshot management device of the NAS processing apparatus, isolates the duplicated data based on the duplication instruction from the NAS processing apparatus, and sets one of the duplicated data as a snapshot.

15. A snapshot acquisition method according to claim 14, wherein the communication path is a network.

16. A storage system according to claim 14, wherein the data is duplicated in units of data blocks.

17. A storage apparatus in combination that is controllable by a NAS processing apparatus that provides file service through a communication path, the storage apparatus comprising a copy device that copies data, wherein, upon receiving a data renewal request to renew data targeted for snapshot, the NAS processing apparatus issues a data copy instruction to the copy device of the storage apparatus to copy the data targeted for snapshot, and the copy device of the storage apparatus copies the data based on the received data copy instruction, and the copy device of the storage apparatus preserves the data in a separate region of the storage apparatus.

18. A snapshot acquisition method according to claim 17, wherein the data includes a plurality of files, and each of the files includes at least one block, wherein the data renewal request is an instruction to renew said at least one block in one of the files, wherein the copy device copies said at least one block in the separate region.

19. A snapshot acquisition method according to claim 17, wherein the data copy instruction designates a physical address of the data, a block length of the data, and a physical address at a copy destination where the data is copied.

20. A storage apparatus in combination that is controllable by a NAS processing apparatus that provides me service through a communication path, the storage apparatus comprising a duplicating device that duplicates data, wherein the duplicating device duplicates the data targeted for duplication based on a duplication instruction and physical address of the data targeted for duplication issued from the NAS processing apparatus, isolates the duplicated data based on the received duplication an instruction from the NAS processing apparatus, and sets one of the duplicated data as a snapshot.

21. A storage system according to claim 20, wherein the data is duplicated in units of data blocks.

* * * * *